(12) United States Patent
Weil et al.

(10) Patent No.: US 9,199,591 B2
(45) Date of Patent: Dec. 1, 2015

(54) FRAME STRUCTURE FOR A MOTOR VEHICLE

(71) Applicant: GM GLOBAL TECHNOLOGY OPERATIONS LLC, Detroit, MI (US)

(72) Inventors: Michael Weil, Rockenberg (DE); Jens Hartmann, Floersheim (DE); Klaus-Peter Eckhardt, Offenbach (DE)

(73) Assignee: GM GLOBAL TECHNOLOGY OPERATIONS LLC, Detriot, MI (US)

( * ) Notice: Subject to any disclaimer, the term of this patent is extended or adjusted under 35 U.S.C. 154(b) by 0 days.

(21) Appl. No.: 14/303,269

(22) Filed: Jun. 12, 2014

(65) Prior Publication Data
US 2014/0367985 A1 Dec. 18, 2014

(30) Foreign Application Priority Data

Jun. 13, 2013 (DE) .......................... 10 2013 009 946

(51) Int. Cl.
*B60R 19/34* (2006.01)
(52) U.S. Cl.
CPC .................................... *B60R 19/34* (2013.01)
(58) Field of Classification Search
CPC ........ B60R 19/34; B60R 19/04; B60R 19/24; B60R 2019/247; B62D 21/152
USPC ......... 293/132, 133, 155; 296/187.09, 187.11
See application file for complete search history.

(56) References Cited

U.S. PATENT DOCUMENTS

| | | | |
|---|---|---|---|
| 3,820,834 A | 6/1974 | Wilfert et al. | |
| D245,597 S * | 8/1977 | Gee et al. ..................... | D12/169 |
| 8,419,116 B2 * | 4/2013 | Boettcher et al. ........ | 296/203.02 |
| 8,807,632 B2 * | 8/2014 | Ramoutar et al. ....... | 296/187.09 |
| 2004/0195862 A1 | 10/2004 | Saeki et al. | |
| 2010/0230983 A1 * | 9/2010 | Braunbeck et al. ........... | 293/133 |
| 2012/0248820 A1 * | 10/2012 | Yasui et al. .............. | 296/187.09 |
| 2014/0008924 A1 * | 1/2014 | Han et al. ...................... | 293/133 |
| 2014/0361561 A1 * | 12/2014 | Kuriyama et al. ............ | 293/133 |

FOREIGN PATENT DOCUMENTS

JP 11048883 A 2/1999
JP 2000062551 A 2/2000

* cited by examiner

*Primary Examiner* — Pinel Romain
(74) *Attorney, Agent, or Firm* — Ingrassia Fisher & Lorenz PC

(57) ABSTRACT

A frame structure for a motor vehicle is disclosed which includes a side member, a bumper cross member, a first crash box arranged in extension of the side member and a second crash box, which obliquely branches off to the side from the arrangement of side member and first crash box. The bumper cross member protrudes over the first crash box towards the side, and an outer end of the second crash box is fastened to the bumper cross member.

12 Claims, 2 Drawing Sheets

FRAME STRUCTURE FOR A MOTOR VEHICLE

CROSS REFERENCE TO RELATED APPLICATION

This application claims priority to German Patent Application No. 102013009946.3 filed Jun. 13, 2013, which is incorporated herein by reference in its entirety.

TECHNICAL FIELD

The present disclosure relates to a frame structure for a motor vehicle with a side member, a bumper cross member, a first crash box arranged in extension of the side member and a second crash box, which obliquely branches off the arrangement of side member and first crash box.

BACKGROUND

JP 2000 062 551 discloses a frame structure having first crash boxes of a right and off a left side member and received at the ends of the linear bumper cross member. The bumper cross member supports a middle region of a bumper outer skin via a compressible body. Edge regions of the compressible body and of the bumper outer skin are supported via the second crash boxes in order to consume collision energy through compression of one of the second crash boxes when the vehicle collides with an obstacle with little coverage and dampen the impact.

In light of this structure, there is a need in the art for a more effective construction to damp collisions with low coverage.

SUMMARY

According to an embodiment of the present disclosure, a frame structure for a motor vehicle is provided with a side member, a bumper cross member, a first crash box arranged in extension of the side member and a second crash box which branches off the arrangement of side member and first crash box. The bumper cross member extends over the first crash box towards the side and an outer end of the second crash box is fastened to the bumper cross member. The sideways extension of the bumper cross member reduces the probability that during the collision with a sharp-edged obstacle the vehicle outer skin is torn open and the second crash box located behind is bent to the side uncompressed and sheared off. Instead, the extended bumper cross member stabilizes the bumper outer skin against tearing-open, and the connection between bumper cross member and second crash box prevents the latter from being bent to the side. In that the protruding region of the bumper cross member can yield to an impact only with simultaneous compression of the second crash box, thus ensuring that during a collision with low coverage a maximum of energy is absorbed. In addition, the first crash box which is adjacent at the point of impact on the obstacle can also be compressed and because of this consume impact energy.

When an anchorage section of the first crash box is plug-connected to the side member, it can contribute to the stiffness of the side member, and in this way reduce the probability that the side member is deformed through a collision at low speed. The plug connection can be established in that the anchorage section of the first crash box is plugged into the side member. Outer surfaces of the first side member which are exposed in the overlap region between anchorage section and first side member, in particular on its upper and lower walls, are then available for fastening other structural components such as member arms for a second, lower bumper cross member or for a hood lock bracket to the side member.

An inner end of the second crash box can be additionally fastened to an exposed lateral wall of the side member. When the anchorage section of the first crash box is plugged into the side member the fastening of the inner end of the second crash box can be effected at the tip of a side wall of the side member, overlapping with the anchorage section plugged in there. Such fastening of the second crash box to the side member should be detachable in order to make possible a replacement of the second crash box after a collision without impairing the side member, preferentially it is effected by screwing. Thus, a threaded fastener can serve in order to connect the lateral wall of the side member both to a front wall of the second crash box as well as to a side wall of the first crash box. In particular, the lateral wall of the side member can be clamped by the screw between the front wall of the second crash box and the side wall of the first crash box.

Alternatively, the inner end of the second crash box can also be fastened to a side wall of the first crash box. Thus, both crash boxes can be preassembled into an assembly outside the vehicle, which is subsequently fastened to the side member. In this case, the inner end of the second crash box is preferentially welded to the side wall.

The second crash box will generally have a smaller cross section than the first crash box. Upper and lower walls of the first and second crash box each preferably extend in a same plane, so that compression forces acting in the upper or lower walls of the second crash box can be discharged into upper or lower walls of the first crash box or of the side member, not indenting their lateral walls.

The bumper cross member can include a hollow profile to which the crash boxes are fastened.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
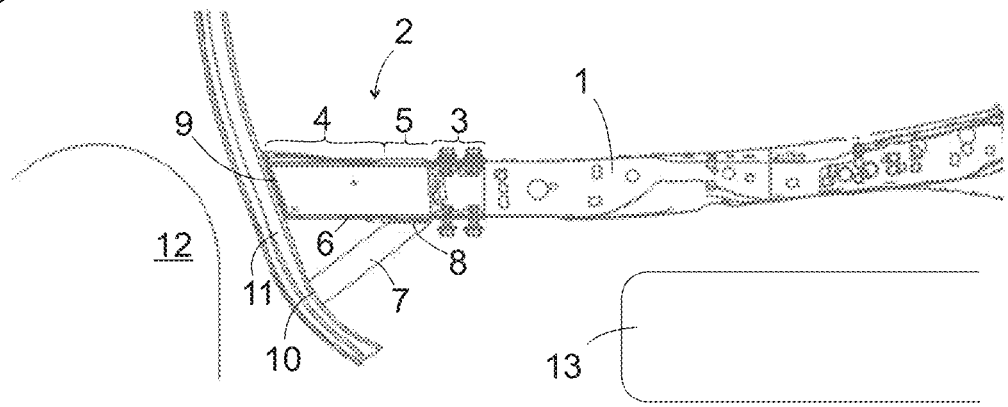
FIG. 1 shows a top view of a frame structure according to the present disclosure.

FIG. 1 shows in a top view a partial illustration of a frame structure of a motor vehicle. The frame structure includes two side members 1, symmetrically arranged along the longitudinal axis of the motor vehicle body and of which the left side member 1 is partly shown in FIG. 1. The side member 1 is a hollow profile which is obtained through hydroforming or by welding-together two deep-drawn or roll-formed sheet metal stampings along their lateral edges. At an open front end of the side member 1 a first crash box 2 is mounted. The first crash box 2 is an elongated hollow body with an anchorage section 3 engaging into the face-end opening of the side member 1, a compression section 4 and a transition section 5 between the anchorage section 3 and the compression section 4. Arranged on an outer side wall 6 of the first crash box 2 is mounted a second crash box 7 projecting obliquely towards the front and towards the side. Like the first crash box 2, the second crash box 7 is an elongated hollow body, even though smaller in width than the first one, and it is obliquely cut off at its inner end 8 for attachment to the side wall 6 such as by welding.

Outer ends 9, 10 of the crash boxes 2, 7 are attached to a bumper cross member 11 such as by welding. The bumper cross member 11 preferably has a hollow profile. Between the bumper cross member 11 and a bumper outer skin carried by the former, a compressible body (not shown in the figure) for example a beam of rigid foam extending over the entire length of the bumper cross member 11 can be arranged.

When the vehicle in the configuration shown in FIG. 1 collides with low coverage with a fixed obstacle 12, both crash boxes 2, 7 are compressed. While substantially only compression forces in vehicle longitudinal direction act on the first crash box 2, a force component in vehicle transverse direction also occurs on the second crash box 7, which pushes the vehicle aside in lateral direction, in the configuration of FIG. 1 with respect to the driving direction to the right. With a very low coverage, the pushing-aside action can be sufficient in order to steer the vehicle body passed the obstacle substantially undeformed. With the extent of coverage shown in FIG. 1, the force, which the obstacle 12 upon a continued penetration into the vehicle body can exert on a wheel 13 arranged behind it is reduced through the compression of the crash box 7 and consequently also the force with which the wheel 13, when it is pushed back from the obstacle 12, presses against a front wall of the vehicle body possibly deforming the vehicle body. Thus, the crash box 7 also contributes to improved occupant protection.

Figure 2:
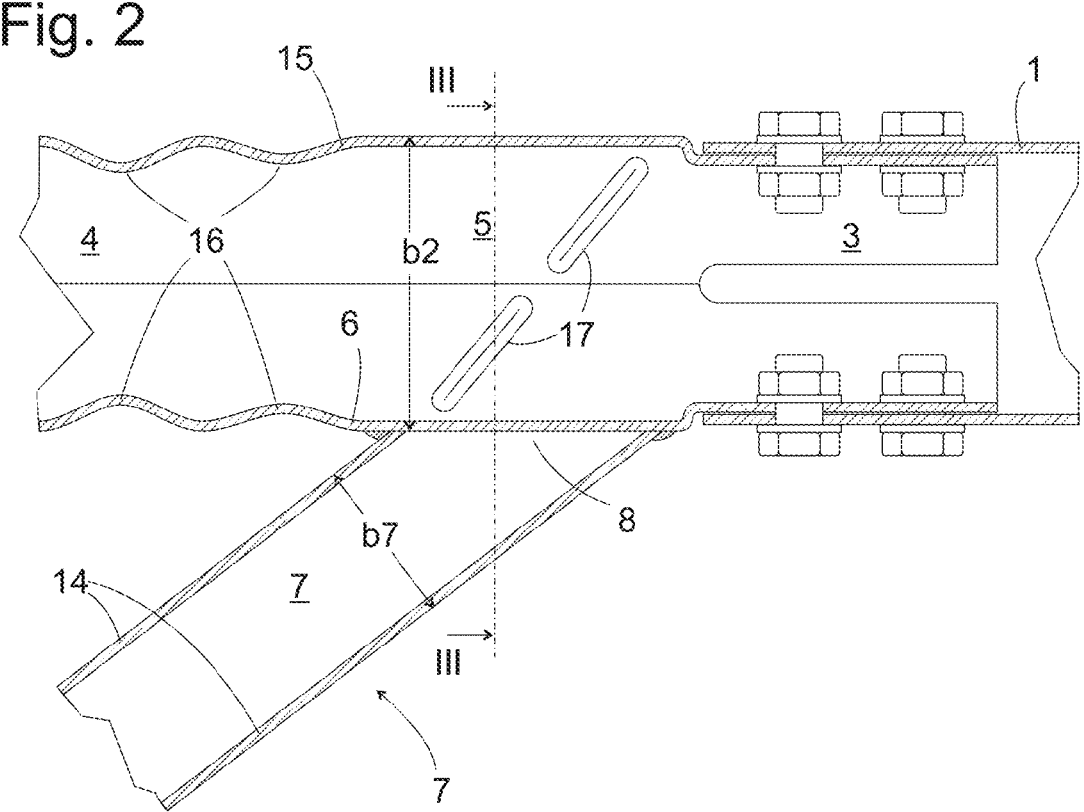
FIG. 2 shows an enlarged detail of the frame structure in a horizontal section.

FIG. 2 shows the transition section 5 of the first crash box 2 in an enlarged horizontal section and its surroundings. The outer side wall 6 of the first crash box 2 is almost completely covered by the inner end 8 of the second crash box 7 in the transition section 5. Side walls 14 of the second crash box 7 are shown linearly here, however as is shown for the outer side wall 6 and an inner side wall 15 of the crash box 2 in their compression section 4, can also be provided with wavy indentations or bulges 16 which function as crush initiators in order to ensure a deterministically predictable compression behavior. When the second crash box 7 is loaded during a collision it exerts a substantial inwardly directed force which is perpendicular to the surface of the side wall 6 of the crash box 2, on the side wall 6. In order to ensure that during the course of the collision-induced deformation the second crash box 7 yields before the side wall 6, the second crash box 7 may be formed structurally weaker than the crash box 2. Since it is practical for a rational production to use sheet metals of the same thickness for both crash boxes 2, 7, the structurally weaker structure of the second crash box 7 can be achieved in particular by a smaller cross section, preferably in the form of a smaller width b7 than the width b2 of the first crash box 2, as is evident in FIG. 2. It is conceivable, in addition, to stiffen the crash box 2 in its transition section 5 by including a transverse wall, which is not shown, or by beads 17 running approximately in the active direction of the compressive force exerted by the second crash box 7 in upper and lower walls of the crash box 2.

Figure 3:
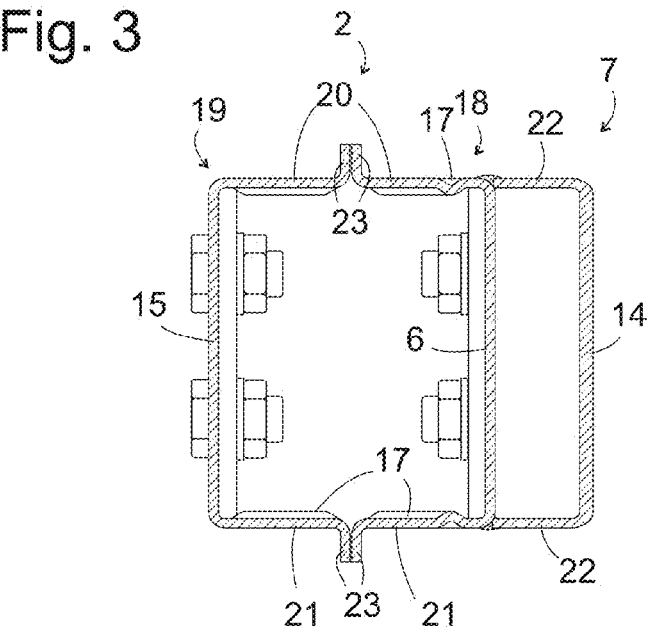
FIG. 3 shows a section along the plane III-III from FIG. 2.

FIG. 3 shows such a construction in cross section along the plane III-III from FIG. 2. Here, the first crash box 2 is formed from two profiles 18, 19 with a top hat-like shaped cross section, of which one forms the outer side wall 6 and the other one the inner side wall 15 facing the engine compartment and which each form a left or right half of an upper wall 20 or of a lower wall 21 of the first crash box 2. Flanges 23 of the two profiles 18, 19 which are welded together project from the walls 20, 21 towards the top and towards the bottom. In order to efficiently absorb the forces transmitted by horizontal walls 22 of the second crash box 7 in the event of a collision, the upper and lower walls 20, 21 each extend in a same plane with the horizontal walls 22.

Figure 4:
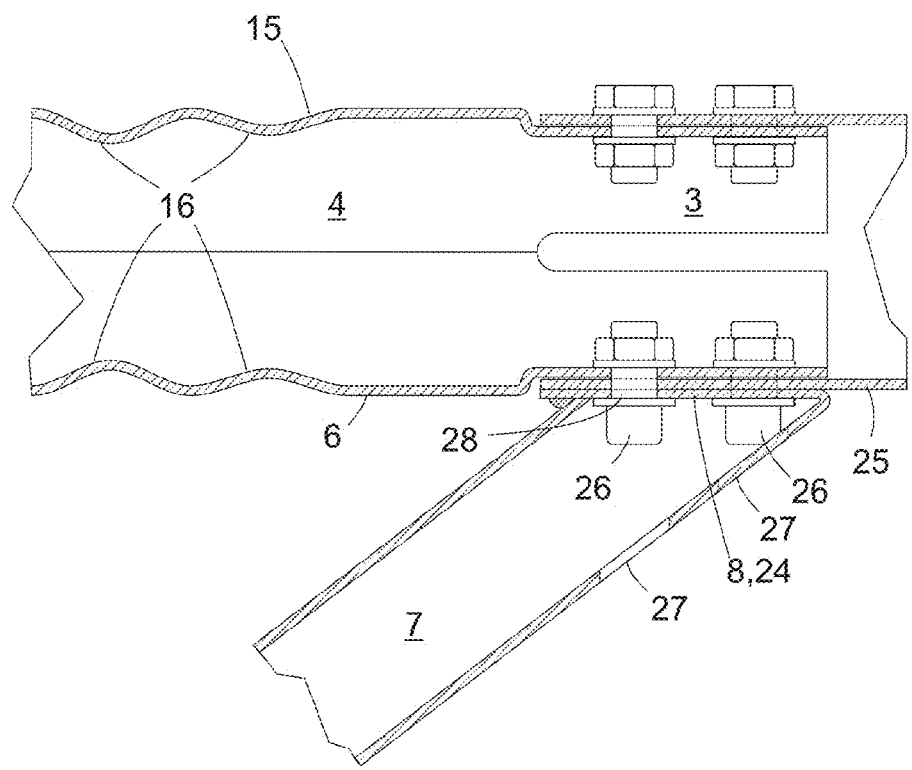
FIG. 4 shows a section analogous to FIG. 2 according to a modified configuration.

In a section which is analogous to FIG. 2, FIG. 4 shows a modification of the frame structure according to the present disclosure. The transition section 5 of the first crash box 2 which is difficult to compress as a result of the welded connection to the second crash box 7 has been omitted here; instead, the inner end 8 of the second crash box 7 is closed by a face plate 24, which is fixed to an outer side wall 25 of the side member 1 with the same threaded fasteners 26 which also fix the anchorage section 3 of the crash box 2 which is plugged into the side member 1. In order to be able to insert the fasteners 26, the outer side wall 14 of the second crash box 7 is provided with openings 27, which are in alignment with screw holes 28 of the face plate 23.

With the configurations considered above, the anchorage section 3 of the first crash box 2 is each inserted in the side member 1 and fixed with threaded fasteners, which press its side walls 6, 15 from the inside from the side walls of the side member 1. Conversely, however, a construction is also possible in which the tip of the side member 1 engages in the anchorage section 3 and its side walls abut those of the side member 1 on the outside. With such a construction the side member 1, in particular in modification of the representation of FIG. 2, can be extended as far as into the transition section 5 in order to support the same from the inside and thereby prevent the outer side wall 6 from yielding under the pressure of the second crash box 7 before both crash boxes 2, 7 are compressed.

It is to be understood that the above detailed description and the drawings represent certain exemplary configurations of the present disclosure but that they are only intended for illustration and should not be interpreted as being restrictive regarding the scope of the present disclosure. Various modifications of the described configurations are possible without leaving the scope of the following claims and their equivalents range. In particular, this description and the figures also show features of the exemplary embodiments which are not mentioned in the claims. Such features can also occur in combinations other than those specifically disclosed here. The fact that multiple such features are mentioned in a same sentence or in another type of context with one another, does not therefore justify the conclusion that they can only occur in the specific combination disclosed; instead it must be assumed in principle that of multiple such features individual ones can also be omitted or modified provided this does not question the functionality of the present disclosure.

The invention claimed is:
1. A frame structure for a motor vehicle comprising:
a side member;
a first crash box, having a compression section and a transition section, longitudinally extending from an anchorage section of the side member, the transition section of the first crash box adjacent to the anchorage section of the side member;
a second crash box obliquely extending from at least one of the anchorage section and the transition section of the arrangement of side member and first crash box, the second crash box being a deformable energy absorbing member; and a bumper cross member positioned over the first crash box to the side and fastened to an outer end of the second crash box.

2. The frame structure according to claim 1 comprising the anchorage section of the first crash box is plug-connected to the side member.

3. The frame structure according to claim 1 comprising the anchorage section of the first crash box is plugged into the side member.

4. The frame structure according to claim 1 comprising an inner end of the second crash box is fastened to a side wall of the first crash box.

5. The frame structure according to claim 4 wherein the inner end is welded to the side wall.

6. The frame structure according to claim 1 comprising an inner end of the second crash box is fastened to a side wall of the side member.

7. The frame structure according to claim 6, wherein the inner end is fastened to the side wall of the side member by threaded fasteners.

8. The frame structure according to claim 7, wherein a threaded fastener connects a front wall of the second crash box, the side wall of the side member and a side wall of the first crash box to one another.

9. The frame structure according to claim 8, wherein the side wall of the side member is clamped between the front wall of the second crash box and the side wall of the first crash box.

10. The frame structure according to claim 1, wherein the second crash box has a second cross section which is smaller than a first cross section of the first crash box.

11. The frame structure according to claim 1, wherein upper and lower walls of the crash boxes each extend in a common plane.

12. The frame structure according to claim 1, wherein the bumper cross member comprises a hollow profile to which the crash boxes are fastened.

\* \* \* \* \*